(12) United States Patent
Hall et al.

(10) Patent No.: US 10,476,884 B2
(45) Date of Patent: *Nov. 12, 2019

(54) METHODS AND SYSTEMS FOR USER OPT-IN TO DATA PRIVACY AGREEMENTS

(71) Applicant: VERIPATH, INC., New York, NY (US)

(72) Inventors: Nicholas Hall, Brooklyn, NY (US); Steven Eakin, Freeport, NY (US)

(73) Assignee: VERIPATH, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,126

(22) Filed: Aug. 23, 2018

(65) Prior Publication Data

US 2018/0367545 A1     Dec. 20, 2018

Related U.S. Application Data

(63) Continuation of application No. 15/587,748, filed on May 5, 2017, now Pat. No. 10,075,451.

(60) Provisional application No. 62/468,502, filed on Mar. 8, 2017.

(51) Int. Cl.
| | |
|---|---|
| *H04L 29/06* | (2006.01) |
| *H04W 12/08* | (2009.01) |
| *G06F 21/62* | (2013.01) |
| *H04W 12/02* | (2009.01) |
| *H04W 4/23* | (2018.01) |

(52) U.S. Cl.
CPC ........ *H04L 63/105* (2013.01); *G06F 21/6245* (2013.01); *H04W 4/23* (2018.02); *H04W 12/02* (2013.01); *H04W 12/08* (2013.01); *H04W 12/0804* (2019.01); *G06F 21/62* (2013.01); *H04L 63/04* (2013.01); *H04L 63/08* (2013.01); *H04L 63/10* (2013.01); *H04L 63/205* (2013.01)

(58) Field of Classification Search
CPC .................................................... H04L 63/105
USPC ............................................................. 726/2
See application file for complete search history.

(56) References Cited

U.S. PATENT DOCUMENTS

2013/0029768 A1\* 1/2013 Eichstaedt ............ G06Q 50/01
463/42

\* cited by examiner

*Primary Examiner* — Jacob Lipman
(74) *Attorney, Agent, or Firm* — Fish IP Law, LLP

(57) ABSTRACT

A method for controlling access to a user's personal information includes obtaining, from an application executing on a device of a user of the application, personal information about the user of an application; determining a required permission from the user for at least one proposed use of the personal information; presenting, to the user, a first offer to provide access to at least one enhanced function of the application in exchange for the required permission; and responsive to the user providing the required permission, providing the user with access to the at least one enhanced function of the application.

24 Claims, 7 Drawing Sheets

| Created ___ | | | |
|---|---|---|---|
| ___ xApp ___ | CONSUMER PRIVACY POLICY | UPDATED LAST ___ | |
| DATA COLLECTED | WHAT IS THE DATA? | HOW IS IT USED? | 3rd Parties Included? |
| Basic Data | Phone information, Operating System, Phone ID | Analytics (how we measure users interacting with our app); | Yes |
| Location | Lat + Longitude, Location Precision (accuracy), Location when app is inactive and open | Analytics, Marketing Segmentation, Market Research | Yes |
| Behavioral Data | Event data that shows the things you do within the application | Analytics, Marketing Segmentation, Market Research | Yes |
| Transactional Data | Purchases made within the app | Analytics, Marketing Segmentation, Market Research | Yes |
| Key to Data Uses | | | |
| Analytics | definition | | |
| Research | definition | | |
| Marketing Segmentation | definition | | |
| 3rd Party Monetization | definition | | |
| Media Targeting | definition | | |
| *App Terms and Conditions inserted below | | | |

FIG. 4

METHODS AND SYSTEMS FOR USER OPT-IN TO DATA PRIVACY AGREEMENTS

CROSS-REFERENCES TO RELATED APPLICATIONS

The present application is a continuation of U.S. Non-provisional application Ser. No. 15/587,748, filed May 5, 2017, which claims the benefit of and priority to U.S. Provisional Application No. 62/468,502, filed Mar. 8, 2017, the entire contents of which are incorporated by reference herein for all purposes

BACKGROUND

Technical Field

The application generally relates to managing privacy of personal information on computer systems, and more particularly, in one aspect, to systems and methods for allowing users to opt-in to data sharing arrangement as part of data privacy agreements.

Background

Online services, as well as the mobile device apps that can be used to access those services, are ubiquitous, allowing users to socialize, bank, shop, navigate, and more. The convenience these services offer-including the personalized features and intuitive capabilities based on users' preferences and past activities-make them nearly indispensable for many. Yet there is a tradeoff for such convenience: such services and applications must gather volumes of information about the user in order to be useful to the user.

Such information is gathered in at least two ways. First, the user may be prompted to input or otherwise provide the information, such as by typing his home address into a form, or by logging into an online banking program by providing her bank account information. Second, as the user interacts with the application and/or online, information about her activities or status may be collected automatically by the application. For example, a navigation application may determine and store the user's current or previous locations, and may identify patterns in the user's movements, such as by concluding that a location to which the user travels each weekday morning is his place of employment. Vast amounts of such information may be collected as the user moves through the digital world, including purchasing (and even browsing) history on ecommerce sites, social media activities and relationships, favorite websites, dining habits, and the like.

Because of the sensitivity of this personal information, many states and countries have enacted strict requirements for presenting users with a privacy policy detailing how the information will be used, and require that the user consent to the policy before collecting the information. Due to those requirements, users of applications that collect personal information are essentially presented with an ultimatum at the outset: either agree that the information may be collected and used by the application without compensation to the user (beyond the use of the application), or be denied access. Yet how can a user consent to something that is not adequately explained? Users often have no idea how their data is being used, because application privacy policies can be difficult to locate and impenetrable to read, often stuffed with legalese and dumped on a website. They are rarely read and even less frequently updated; ignored and promptly forgotten by user and application administrator alike.

Further compounding the problem, different jurisdictions require consent for different information and different uses for that information. For example, the forthcoming European Online Data privacy law in the European Union imposes strict requirements on obtaining consent, using and sharing information, and destroying the information upon request (the "right to be forgotten"). Other jurisdictions are more lax. Thus, an identical application offered to two different users in different locations may be required to obtain different types of consent, or risk alienating or annoying some users by applying the strictest requirements to all users, asking for consent beyond what is necessary for that user.

Once collected, some personal data may be legally resold to third parties, including marketers, researchers, and the like, who may in turn use the information for their own uses. Such purchasers must trust the assurances of the collector of the personal information (e.g., the application providers) that the data is "clean"—i.e., that it was collected in accordance with the necessary consent and other requirements. If that trust turns out to be misplaced, however, the purchaser may be liable: data resellers often require indemnification from purchasers in the event the data was illegally collected or used along the way.

SUMMARY

This disclosure addresses the drawbacks of current data collection/privacy schemes by providing an improved, more transparent opt-in process. A "Privacy-as-a-Process" (PaaS) arrangement allows a component of an application (e.g., a mobile app), in conjunction with other components of a distributed system, to determine what information is to be collected from a user, how that information will be used, and what permissions are required from that user for that user. A disclosure matrix is generated and populated clearly explaining to the user in an organized, concise manner what information is to be collected, and how it will be used. The user is given the option to receive additional details and explanation as to the information to be collected and the uses to which it will be put. The user can then provide or withhold informed consent for those uses. In some embodiments, the user may be allowed to selectively provide consent for different uses of different types of information.

In some embodiments, the user may be presented with certain offers in exchange for the user's consent to a proposed use of certain personal information. The offers may be in the forms of credit or money, or may relate to features of the application itself. For example, a user may be offered premium access to certain features of a mobile app that are not accessible to other classes of users, such as "basic" members. To accept the offer, the user would consent to certain uses of the user's information (including, but not limited, sale of the information to third parties). Alternatively, the user may decline the offer, choose to disallow such use of the information and either use the basic features of the app or obtain premium access another way (such as by paying a monthly subscription for it). Multiple tiers of offers may be presented to the user, with the user receiving access to better features in exchange for agreeing to share more information, and/or allow more or different uses of that information. For example, a user of an online music streaming app may be presented with the opportunity to obtain 5 credits (redeemable in the app for access to a premium service) in exchange for allowing the user's location to be shared with third parties, and may presented with the opportunity to obtain 10 credits in exchange for allowing the user's location and listening habits to be shared.

According to one aspect, a method for controlling access to a user's personal information is provided. The method includes obtaining personal information about a user of an application; determining a required permission from the user for at least one proposed use of the personal information; presenting, to the user, a first offer to provide access to at least one enhanced function of the application in exchange for the required permission; and responsive to the user providing the required permission, providing the user with access to the at least one enhanced function of the application.

According to one embodiment, the at least one enhanced function of the application is functionality not available to at least one other group of users of the application. According to another embodiment, the at least one enhanced function of the application is a reduced number of commercial advertisements presented to the user in the application. According to another embodiment, the method includes presenting, to the user, a second offer to provide access to a second function of the application in exchange for a payment from the user; and responsive to the user making the payment, providing the user with access to the second function of the application.

According to yet another embodiment, the personal information includes at least one of user location, user name, user address, user background information, user age, user gender, user household income, user family or marital status, and user transactional history. According to another one embodiment, the at least one proposed use of the personal information includes at least one of analytics, market research, market segmentation, and disclosure to third parties. According to another embodiment, the method includes determining a value for the required permission from the user for at least one proposed use of the personal information; and generating the first offer based, at least in part, on the value for the required permission. According to a further embodiment, the value is determined with reference to at least one of the type of the personal information and demographic information for the user. According to one embodiment, the method includes determining a second required permission from the user for a second at least one proposed use of the personal information; presenting, to the user, a second offer to provide access to a second at least one enhanced function of the application in exchange for the second required permission; and responsive to the user providing the second required permission, providing the user with access to the second at least one enhanced function of the application.

According to one embodiment, determining the required permission from the user for the at least one proposed use of the personal information is performed with reference to at least one of a current location of the user, a previous location of the user, and a residential location of the user. According to another embodiment, the application is a mobile application installed on a mobile device.

According to another aspect, a method for controlling access to a user's personal information is provided. The method includes obtaining personal information about a user of an application; determining a required permission from the user for at least one proposed use of the personal information; presenting, to the user, a plurality of offers to provide access to at least one function of the application, at least one first offer of the plurality of offers conditioned on the user providing the required permission; and responsive to the user accepting one of the plurality of offers, providing the user with access to the at least one function of the application.

According to one embodiment, the method includes presenting, to the user, at least one second offer to provide access to the at least one function of the application in exchange for a payment from the user; and responsive to the user making the payment, providing the user with access to the at least one function of the application.

According to another aspect, a system for controlling access to personal information is provided. The system includes an application component executed by a software application and configured to identify at least one piece of personal information proposed to be collected by the software application and at least one proposed use of the personal information, the at least one piece of personal information relating to a user of the software application; a permission component configured to identify a necessary permission to be obtained from the user for the at least one proposed use of the personal information; and a privacy display component configured to display to the user the at least one item of personal information about the user proposed to be collected by the application and the at least one proposed use of the personal information, and to receive from the user an indication relating to the necessary permission.

According to one embodiment, the permission component is configured to identify the necessary permission to be obtained from the user based on at least one of a current location of the user, a previous location of the user, and a residential location of the user. According to another embodiment, the privacy display component is configured to display the at least one item of personal information about the user proposed to be collected by the application in a display matrix, the at least one item of personal information being visually related to the at least one proposed use of the personal information. According to a further embodiment, the display matrix is presented to the user on a website. According to a further embodiment, the display matrix is presented to the user in the application.

According to another embodiment, the application component is configured to identify the at least one piece of personal information to be collected by the software application and the at least one proposed use of the personal information based on a privacy policy of the software application. According to yet another embodiment, the permission component comprises an offer database including a plurality of offers to be presented to the user, the offer being an offer of a benefit in exchange for the user providing the necessary permission. According to still another embodiment, the indication from the user is a gesture in the user interface.

According to another aspect, a method for controlling access to a user's personal information is provided. The method includes identifying at least one piece of personal information proposed to be collected by a software application, the at least one piece of personal information relating to a user of the software application; identifying at least one proposed use of the personal information; determining a necessary permission to be obtained from the user for the at least one proposed use of the personal information; displaying to the user the at least one item of personal information about the user proposed to be collected by the software application and the at least one proposed use of the personal information; and receiving from the user an indication relating to the necessary permission.

According to yet another aspect, a method for controlling access to a user's personal information is provided. The method includes obtaining, from an application executing on a device of a user of the application, personal information about the user of an application; determining a required permission from the user for at least one proposed use of the personal information; presenting, to the user, a first offer to provide access to at least one enhanced function of the application in exchange for the required permission; and responsive to the user providing the required permission, providing the user with access to the at least one enhanced function of the application.

According to one embodiment, the method includes determining a value for the required permission from the user for at least one proposed use of the personal information; and generating the first offer based, at least in part, on the value for the required permission. According to a further embodiment, the value is determined with reference to at least one of the type of the personal information and demographic information for the user.

According to another embodiment, the at least one enhanced function of the application is functionality not available to at least one other group of users of the application. According to yet another embodiment, the at least one enhanced function of the application is a reduced number of commercial advertisements presented to the user in the application. According to still another embodiment, the method includes presenting to the user, simultaneously with the first offer, a second offer to provide access to the at least one enhanced function of the application in exchange for a payment from the user; and, responsive to the user making the payment, providing the user with access to the at least one enhanced function of the application.

According to another embodiment, the method includes presenting, to the user, a second offer to provide access to a second function of the application in exchange for a payment from the user; and responsive to the user making the payment, providing the user with access to the second function of the application. According to yet another embodiment, the personal information includes at least one of user location, user name, user address, user background information, user age, user gender, user household income, user family or marital status, and user transactional history. According to still another embodiment, the at least one proposed use of the personal information includes at least one of analytics, market research, market segmentation, and disclosure to third parties.

According to yet another embodiment, the method includes determining a second required permission from the user for a second at least one proposed use of the personal information; presenting, to the user, a second offer to provide access to a second at least one enhanced function of the application in exchange for the second required permission; and responsive to the user providing the second required permission, providing the user with access to the second at least one enhanced function of the application. According to another embodiment, determining the required permission from the user for the at least one proposed use of the personal information is performed with reference to at least one of a current location of the user, a previous location of the user, and a residential location of the user.

According to another embodiment, the application is a mobile application installed on a mobile device. According to yet another embodiment, the method includes displaying at least one item of personal information about the user proposed to be collected by the application in a display matrix, the at least one item of personal information being visually related to the at least one proposed use of the personal information. According to a further embodiment, the display matrix is presented to the user on one of a website and the application.

According to another embodiment, the method includes identifying at least one piece of personal information to be collected by the application and the at least one proposed use of the personal information based on a privacy policy of the application.

According to another embodiment, the method includes receiving, from user, an indication regarding required permission via a user interface of the device. According to yet a further embodiment, the indication from the user is a gesture in the user interface.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 4 is an exemplary user interface according to some embodiments;

DETAILED DESCRIPTION

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
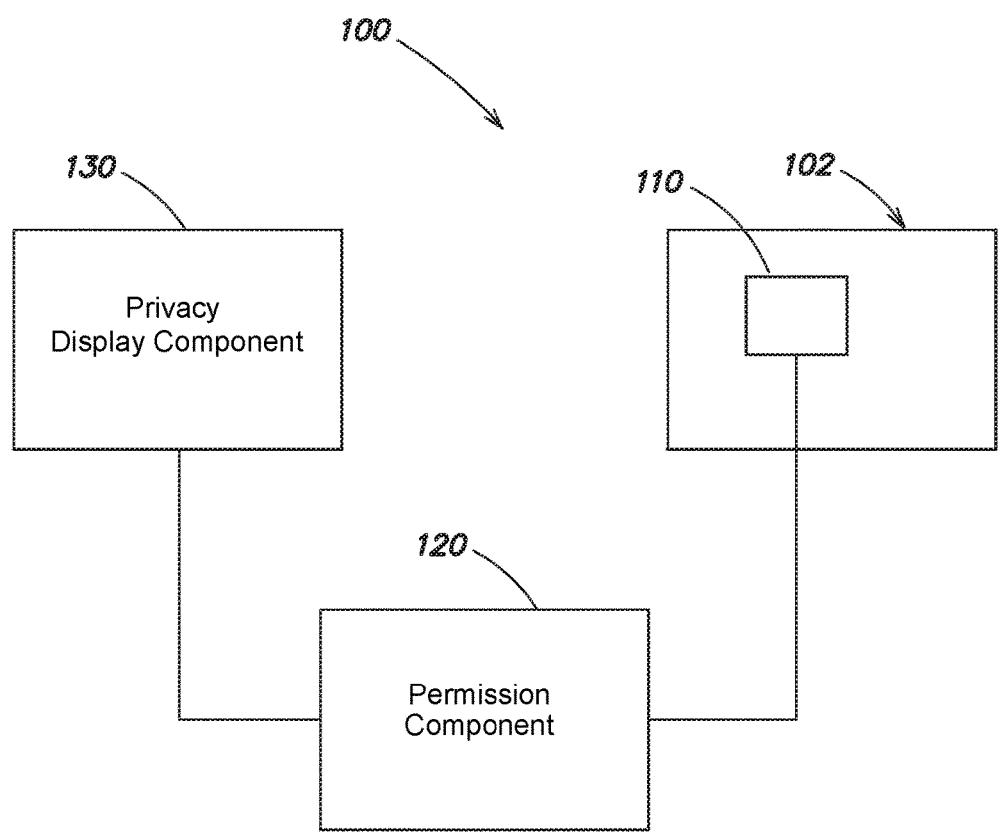
FIG. 1 is a block diagram of a computer system for controlling access to personal information according to some embodiments.

FIG. 1 is a block diagram of a system 100 configured to perform methods of soliciting user opt-in to data privacy agreements. The system 100 includes an application component 110 configured to execute on a user device 102, such as the user's mobile device, laptop computer, or other computing device 102. The application component 110 is configured to identify one or more pieces of personal information to be collected by the application, as well as one or more intended uses of that personal information.

Information about the personal information to be collected and the intended uses is provided to a permission component 120, which is configured to identify a necessary permission to be obtained from the user for the at least one proposed use of the information. The permission component 120 may preferably be a separate component (e.g., a server) operated by a sysadmin of the system 100, or may instead be a part of the application component 110. The permission component 120 may identify the necessary permission to be obtained with reference to one or more sources, such as the laws or regulations of the jurisdiction in which the user is located, by a policy set by the sysadmin of the system 100 or by the offeror of the application in which the application component 110 is located, or otherwise. For example, the permission component 120 may determine that a particular user must opt-in (i.e., consent) to a particular use of a particular piece of information (e.g., providing the user's zip code and email address to a third-party) before such a use can be made, but need not provide consent about another use of such information (e.g., market research by the offeror of the app itself).

The permission component 120 populates the privacy display component 130 with information about the type of personal information collected and the proposed use of the personal information so that the user can review and/or opt-in to the proposed uses as necessary. In a preferred embodiment, the permission component 120 may be provided on a website, and the application component 110 and/or the application itself may provide a link to the website or otherwise direct the user to the information, such as in a browser of the user device 102. In a preferred embodiment, the user's personal information and proposed uses thereof may be presented in a disclosure matrix, with the user being provided the opportunity in the disclosure matrix to opt-in or opt-out of the proposed use as necessary.

As used herein the term "personal information" refers to information about the user device 102 and/or any users associated with the user device 102. "Personal information" may include, but is not limited to, personally-identifiable information (PII) that can potentially identify an individual. Such personal information may include, for example, the user's name, age, address, phone number, email address, online user ID/handle, date of birth, account number, bank card number, frequent flyer number, and social security number (SSN) or other government-issued identification number. Other personal information may include a user's password; transaction history; a log of online activity, such as websites browsed, search engine activity, ecommerce items viewed, social media interactions, streaming music or video activity; and identifiers of friends or relations. The personal information may further include demographic information about the user, including age group, race/ethnicity, country of citizenship or origin, occupation, income bracket, political affiliations, religious affiliations, hobbies, or interests. The personal information may further include identifiers of the user device 102, such as the IP address, MAC address, operating system version, or other information.

The personal information may be intended or desired to be used in a variety of ways, either by entities associated with the application (e.g., the application creator or offeror) or by third-parties to whom the personal information may be sold, leased, or exchanged for, either in its entirety or in modified form, such as in anonymized or partially-anonymized form. The personal information may be segmented and/or aggregated with other personal information and used for a variety of ends, including analytics, market research, market segmentation, and media targeting. Arrangements for providing the personal information to third parties should also be considered "uses" unto themselves for purposes of this disclosure.

Figure 2:
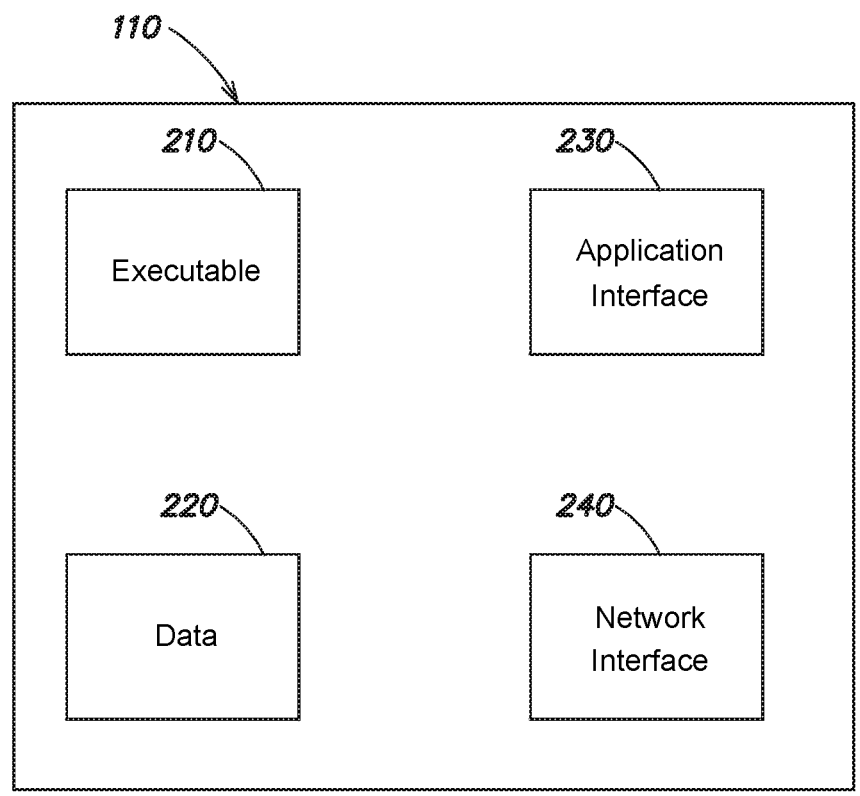
FIG. 2 is a block diagram of an application component of a computer system for controlling access to personal information according to some embodiments.

FIG. 2 shows an application component 110 according to some embodiments. The application component 110 includes an executable component 210, a data store 220, and a network interface 240. The executable component 210 executes one or more instructions to identify the type of personal information to be collected, and the proposed use of the information. In some embodiments, the executable component 210 may be implemented as a Software Development Kit (SDK) within the application, the SDK collecting data from the application to determine what personal information is to be collected and what use is proposed for the personal information. The executable component 210 may be called by the application executable itself, or may be actively provided the personal information types and uses. The executable component 210 may also actively obtain the personal information types and uses by interacting with the application via an Application Programming Interface (API), or by library interposition, network interposition, or other techniques. The executable component 210 may interact with the application via the application interface 230.

The data store 220 may store the personal information types and uses, or identifiers thereof, as well as any relevant user information, including but not limited to a user identifier, the user's age, location, citizenship, privacy preferences, and the like. The data store 220 may store such information in association with one or more users for which those types and uses are relevant. The data store 220 may also store metadata about the opt-in process itself, such as what disclosures were presented to the user, the time/date when the user opted in, etc. Such metadata may be used to filter what data is used in certain ways. For example, some third parties may wish to obtain only data collected under certain conditions, or meeting certain levels of compliance with jurisdictional requirements. The personal information types and uses may be provided to other components of the system 200 (e.g., the permission component 120) by the application component 110 via the network interface 240. In some embodiments, the application component 110 may communicate with other components of the system 200 using a network interface provided by the application, or by the user device 102 generally. In such embodiments, the network interface 240 may not be included in the application component 110.

Figure 3:
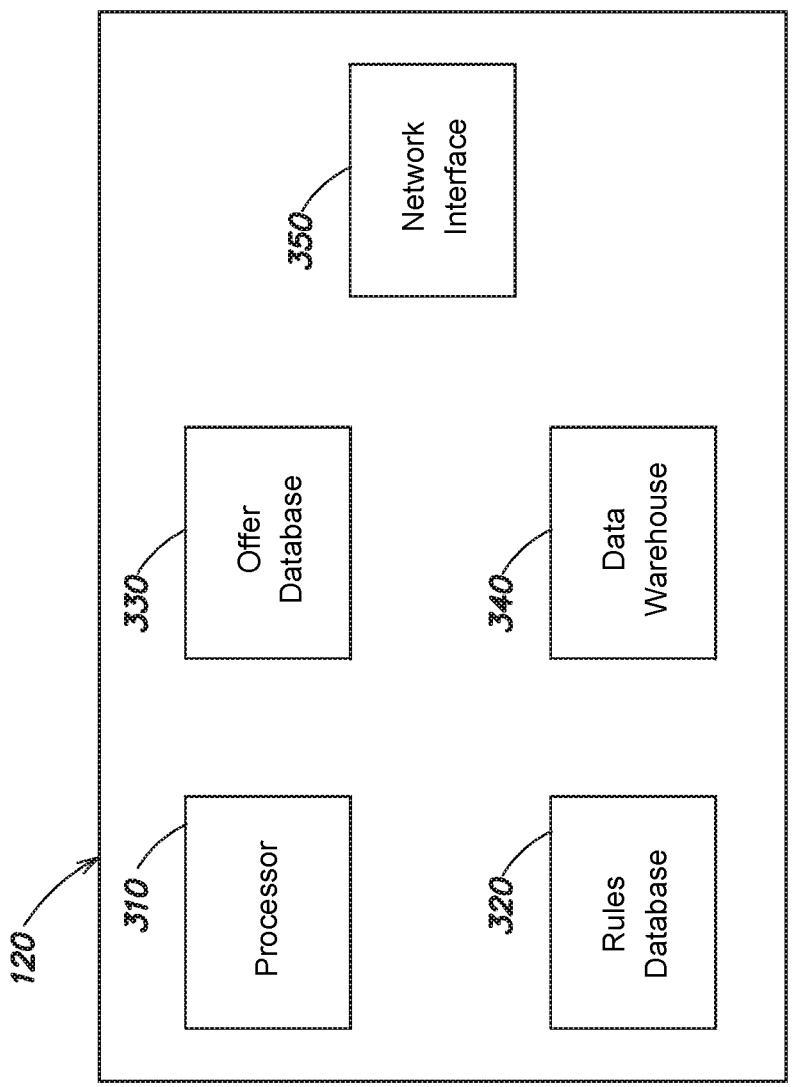
FIG. 3 is a block diagram of a permission component of a computer system for controlling access to personal information according to some embodiments.

FIG. 3 shows a permission component 120 according to some embodiments. The permission component 120 includes a network interface 350 configured to receive, from the application component 110, information about the personal information types and uses, as well as user information. The permission component 120 further includes a processor 310 configured to determine what permissions are necessary for the personal information types and proposed uses identified by the application component 110. The processor 310 makes such a determination with reference to a rules database 320. The rules database 320 may include a set of rules regarding what level of opt-in, if any, is required, for certain uses of certain types of personal information. By applying one or more rules from the rules database 320 to the personal information types and uses received from the application component 110, the permission component 120 can determine what permission is presently required from the user of the application.

The rules database 320 may include different rules for a single type of use based on one or more aspects of the user's information, characteristics of the user, including the user's location, citizenship, age, privacy preferences, and the like. For example, providing location information to a third-party may be the type of use for an adult user for which no permission is required, but for which opt-in must be sought for juvenile users (e.g., less than 18 years of age). The rules database 320 may encode the privacy rules of one or more jurisdictions, and may be applied as part of a hierarchy or decision tree. For example, if it is determined that the user is located in the European Union, a different branch of process flow for applying rules from the rules database 320 may be applied. The user's information, the personal information types and uses, the necessary permissions (determined, for example, with reference to rules database 320), and other information may be stored in a data warehouse 340.

It will be appreciated that the rules applied by the rules database 320 may not be legally or contractually mandated rules, but rather may be policies, guidelines, best practices, or privacy preferences set by the user, the application offeror, or the sysadmin of system 200. In one example, the user may set certain privacy preferences that require the user's opt-in for certain uses of personal information where such opt-in would not otherwise be required or sought.

In some embodiments, the permission component 120 includes an offer database 330. As discussed in more detail below, the offer database 330 may include on or more offers of compensation in exchange for the user's opt-in to certain uses of information. Such compensation may include benefits relating to the application itself, including credits for additional features, services, or benefits, or enhanced or "premium" subscription levels. The processor 310 may identify necessary opt-ins for particular uses of information for a particular user, and may locate in the offer database 330 one or more offers relevant or responsive to the user agreeing to opt-in.

The permission component 120 also includes a network interface 350 configured to communicate with the privacy display component 130. Referring again to FIG. 1, the permission component 120 causes the privacy display component 130 to generate a display for the user showing the personal information types and uses the application proposes to make with the information. The privacy display component 130 may also provide the user the opportunity to provide the necessary opt-ins or receive more information about the proposed uses. In some embodiments, the privacy display component 130 is configured to display the personal information use and opt-in information in a "disclosure matrix."

In some embodiments, the disclosure matrix may summarize or otherwise reflect the official privacy policy set by the maker of the app, and may be a traditional legal document in the form of an agreement or waiver. The terms of the privacy policy may be summarized by a human being to create the disclosure matrix, or the disclosure matrix may be generated from the privacy policy by an automated computer process configured to parse the privacy policy. In some embodiments, important terms or elements of the privacy policy may be flagged by a human to facilitate such an automatic process. In still other embodiments, the disclosure matrix itself, either alone or in conjunction with other documents, may serve as the legally operative privacy policy.

FIG. 4 shows an exemplary disclosure matrix 400 according to some embodiments. The disclosure matrix 400 includes a general region 410, a disclosure region 420, and a resource region 430. The general region 410 includes metadata or other information about the disclosure matrix 400 itself or an underlying privacy policy. For example the dates on which the disclosure matrix 400 was created and most recently updated may be indicated in text boxes 412 and 414, respectively. An identifier of the app, such as the app name or identifier of the app's creator, and the name of the operative document (e.g., "consumer privacy policy") are indicated in text box 416.

The disclosure region 420 includes columns 422-428 that disclose what information is being collected, describes the information at some level of detail, how the information will be used, and whether third parties will receive the information. In particular, columns 422 and 424 disclose the general categories and specific types of personal information to be collected by the app. Such categories may include basic data about the user or their device on which the app is operating; location data derived from the device or other information gleaned about the user's location; behavioral data describing the user's activities within or related to the app; and transactional data describing the user's purchasing activities within or related to the app.

Column 426 identifies one or more proposed uses to be made of the personal information collected by the app and described in the corresponding location in columns 422, 424. Such uses may include analytics (e.g., metrics detailing how users interact with the app), marketing segmentation, or market research. Column 428 identifies whether the uses contemplated in column 426 include disclosing the information to any third parties. In the illustrated embodiment, the disclosure matrix 400 simply indicates whether or not information will be disclosed to any third parties. In other embodiments, the identity of the third parties may be provided. The user may be given the opportunity to select or block one or more third parties from receiving the information.

Resource region 430 provides the user with access to additional detail regarding the personal information and its intended uses. For example, links may be provided to definitions for the types of information and proposed uses identified in columns 424 and 426. By clicking and/or hovering over the links, definitions and additional detail may be provided. In some embodiments, the resource region 430 is not separate from the disclosure region 420. For example, in column 426, the word "Analytics" may appear as a hyperlink; clicking or hovering over it may cause the definition of "Analytics" to appear.

In some embodiments, the application component 110 is configured to receive the user's opt-in directly in the application itself. In other embodiments, the disclosure matrix 400 may also include one or more user interface elements (not shown), including buttons, text boxes, radio buttons, or pull-down menus, allowing the user to interact with the disclosure matrix 400 by opting-in (or not) to a particular use of a particular type of information. For example, the disclosure matrix 400 may include an "Agree" button the user can click to agree to the proposed uses of the personal information set out in the disclosure region 420. In another example, each row of personal information in the disclosure region 420 may be associated with such an element, so that the user may opt-in (or not) to each individual use.

In some embodiments, as described above, the application component 110, the permission component 120, and the privacy display component 130 are arranged in a distributed manner. In one example, the application component 110 executes on the user device 102 (e.g., a smartphone); the permission component 120 executes on a server or other system remote from the application component 110; and the privacy display component 130 presents information (e.g., as a website) on a system remote from the application component 110. The privacy display component 130 may reside on the same system as the permission component 120, or may reside remotely from both the application component 110 and the permission component 120.

Such a distributed arrangement offers an improvement over known systems. For example, by hosting the privacy display component 130 remotely from the application component 110, the system allows for an entity operating the application component 110 to display the privacy policy information in a standardized format that can be changed by the entity or the user.

As another example, the use of a permission component 120 remote from the application component 110 allows for permission rules and requirements to be updated (due to changed user preferences, changes in the law, or otherwise) without requiring changes to the application component 110 running on the user device 102. Such updates to an application typically interrupt use of the application, and require the user to agree to the updates. A user who declines to install such an update may have his/her personal information collected under an out-of-date permission scheme, thereby making the collection out of compliance. The use of the current system avoids such problems by allowing for updates to be made to the rules executed by the permission component 120 without disruption to the user.

According to another aspect, the user may be presented with one or more offers relating to the app in exchange for opting-in to certain uses of the user's personal information by the app or third-parties. For example, the user may be offered, at no monetary cost, access to a premium subscription or enhanced functionality of the app that would otherwise cost money. In exchange for accepting this benefit, the user may be required to opt-in to a particular use of the user's personal information. To continue the example, the user may also be presented with another offer to pay money for the same premium benefits, or may be offered a lesser benefit in exchange for a different kind of use of the user's personal information, such as analytics analysis by the app provider instead of the information being provided to a third party.

Figure 5:
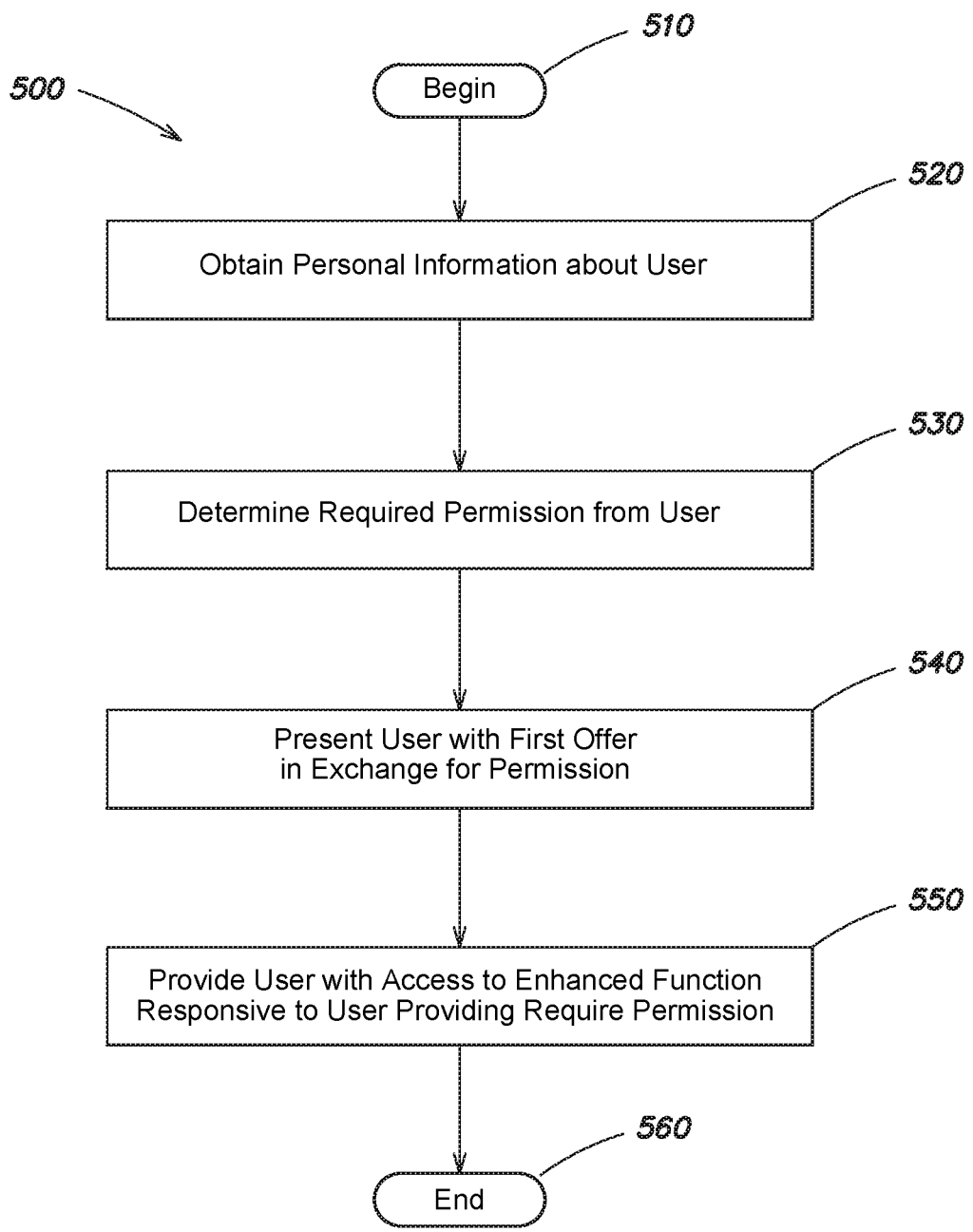
FIG. 5 is a flow diagram of one example process for controlling access to a user's information according to some embodiments.

FIG. 5 illustrates a method 500 for controlling access to a user's personal information according to some embodiments.

At step 510, method 500 begins.

At step 520, personal information about a user of an application is obtained. In some embodiments, a proposed use for the information is also determined. For example, the personal information may include the user's name and address, and the application may propose to use the information by selling it to a third party. The application may actively provide the information to a system component (e.g., the executable component 210 discussed above), or the personal information may be obtained by a process interacting with the application via an Application Programming Interface (API), or by library interposition, network interposition, or other techniques.

At step 530, a required permission from the user is determined for at least one proposed use of the personal information. A database may be referenced to determine whether the user's consent is required for a propose use of a particular type of personal information. Different rules may be provided for a single type of use based on one or more aspects of the user's information or characteristics of the user, including the user's location, citizenship, age, privacy preferences, and the like. The privacy rules of one or more jurisdictions may be stored and applied as part of a hierarchy or decision tree. For example, one set of rules may be applied for a user in a particular jurisdiction, and a different set of rules may be applied for a second user in a second jurisdiction. The permissions required may not be legally or contractually mandated, but rather may be policies, guidelines, best practices, or privacy preferences set by the user, the application offeror, or a system administrator.

At step 540, a first offer is presented to the user to provide access to at least one enhanced function of the application in exchange for the required permission. For example, the user may be presented with one or more offers relating to the app in exchange for opting-in to certain uses of the user's personal information by the app or third-parties. In one example, the offer may include, for example, access to a premium or enhanced feature of the app. For example, certain features of the app may be "unlocked" or otherwise made available. Such features may otherwise only be available in exchange for monetary payment by the user, or may be unavailable altogether apart from opting-in to the offer. In another example, the offer may be for a premium subscription level, or may be an offer for any level of subscription that would otherwise require a one-time or recurring payment. In still another example, the offer may be for a number of "credits" or other currency for use in or in connection with the app. For example, a user of a music download app, in which songs must otherwise be purchased using a credit card or other traditional payment method, may be offered credits that may be redeemed to obtain songs. In still another example, the offer may be for monetary compensation or the equivalent (e.g., a debit card or gift card).

Various terms for controlling the use of the information may be offered. For example, a user may be offered a benefit for a limited amount of time (e.g., a month-long premium subscription), or may be offered a benefit for unlimited use of the information. In some embodiments, the offer may include a term giving the user the opportunity to opt-out of the offer at certain times, possibly losing the benefit and withdrawing consent to the use of the information.

One or more offers may be presented to the user sequentially or simultaneously. In some embodiments, the offers may relate to each other in some aspect, such as by offering different benefits in exchange for the same use of certain personal information, or, conversely, by offering the same benefit in exchange for using different pieces of personal information. In some embodiments, offers may be selected for presentation to the user based on the user's personal information or other information or characteristics of the user. For example, the personal information of a user in a certain demographic (e.g., a particular age range, household or personal income range, geographic location, etc.) may be of particular interest to marketers. To entice that desirable user to agree to allow such third parties to use the user's personal information, the user may be presented with a more valuable offer than other users. For example, the desirable user may be offered 20 credits in exchange for a particular use of the user's information, whereas other users of lesser interest may be offered only 15 credits.

Offers may also be presented to users based on the user's known offer preferences, either with respect to the current app or other settings. For example, if a user has repeatedly accepted, from among a number of offers, an offer for a month's worth of a premium subscription in exchange for allowing the use of the user's in-app behavior, that user may be initially presented with a similar offer at the next opportunity. In some embodiments, the user's past preferences with offers may determine, at least in part, the terms of a current offer. For example, if a user has consistently agreed to certain uses of certain personal information in exchange for premium access, the user may be offered the same premium access in exchange for additional uses of the personal information, or uses of additional or different personal information. In this incremental manner, the true value of the user's opt-in can be estimated.

In some embodiments, an offer market may be established or referred to, with the potential offers to be presented to users adjusted periodically based on interest and/or acceptance of the offer by users. For example, if an offer of 20 credits in exchange for use of a user's personal information is accepted by a very high percentage of users, that may indicate that the offer is higher than necessary. In that case, the number of credits offered may be reduced, or the amount of information to be used, or the types of uses, may be increased or otherwise changed.

Figure 6:
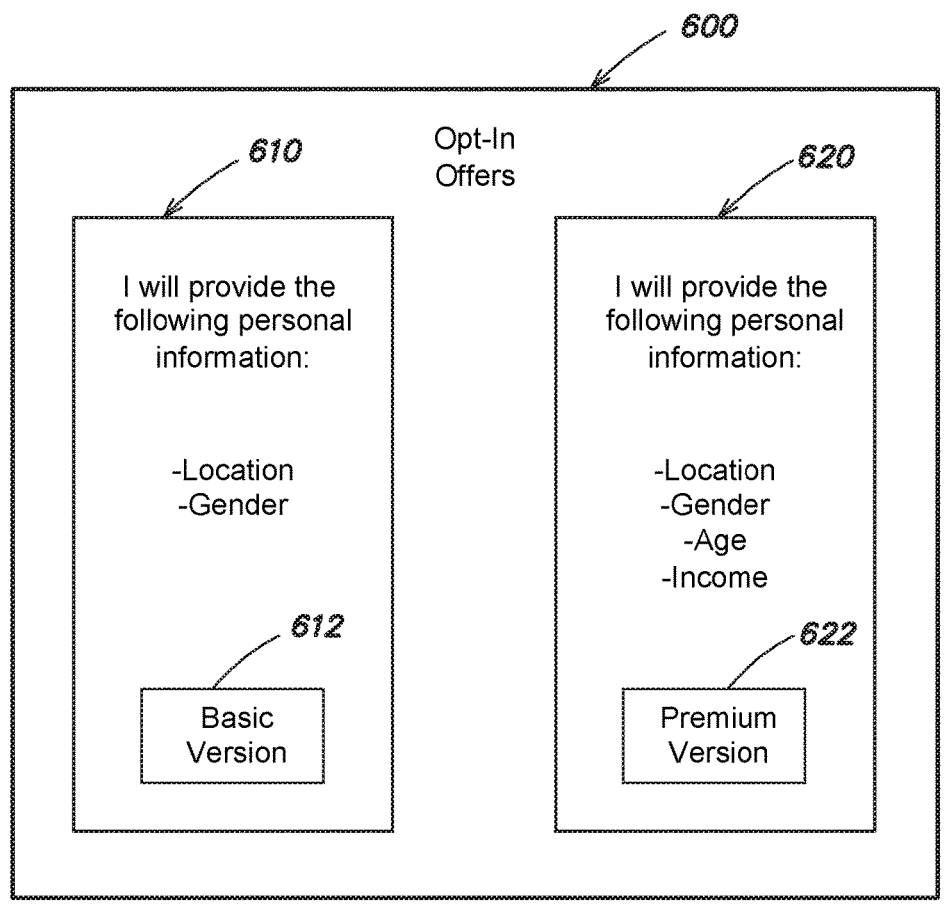
FIG. 6 is an exemplary user interface according to some embodiments.

In some embodiments, two or more offers may be presented simultaneously via a user interface, for example, on the user's mobile device. FIG. 6 shows a screenshot of an exemplary user interface 600 according to some embodiments. In this view, the user is presented with two offers 610 and 620. The first offer 610 offers the user access to a "basic version" of the app in exchange for allowing use of the user's location and gender. The second offer 620 offers the user access to a "premium version" of the app in exchange for allowing use of the user's location, gender, age, and income. The user may select the first offer 610 or second offer 620 by interacting with user interface elements, such as the buttons 612, 622, respectively, or clicking the offers themselves. In some embodiments, the offers may be swipeable, or otherwise interacted with to indicate whether the user is interested in the offer. For example, the user may "swipe away" the first offer, causing another offer to be displayed in its place. Information about what offers the user is interested in may be used to iteratively refine the selection of offers for the user.

Returning again to FIG. 5, at step 550, the user is provided with access to the at least one enhanced function of the application responsive to the user providing the required permission. The user may be automatically granted the access immediately, or may be provided with a promo or authorization code that can be entered within the app to access the enhanced functionality.

At step 560, method 500 ends.

Figure 7:
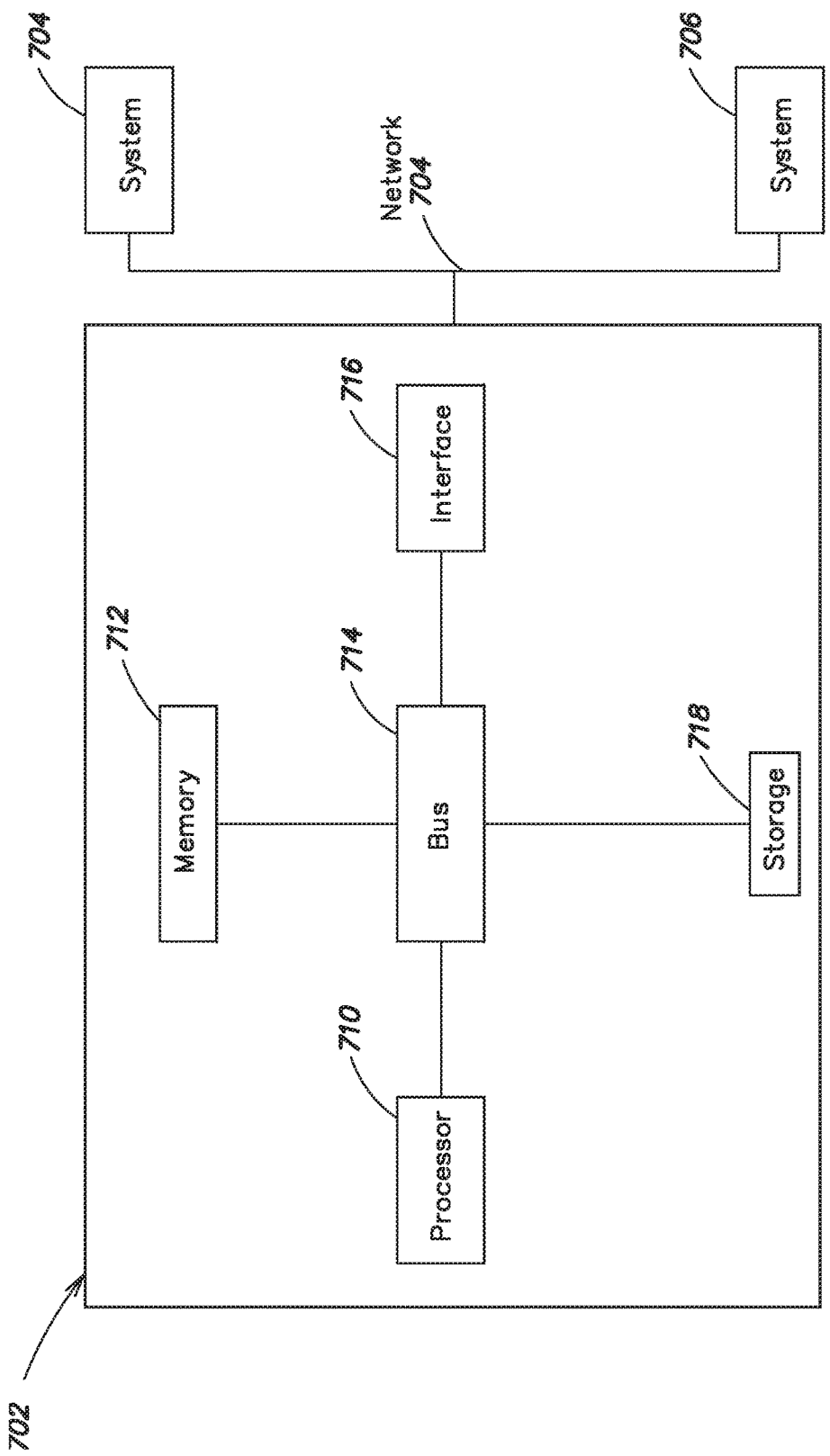
FIG. 7 is a block diagram of one example of a computer system on which aspects and embodiments of this disclosure may be implemented.

FIG. 7 is a block diagram of a distributed computer system 700, in which various aspects and functions discussed above may be practiced. The distributed computer system 700 may include one or more computer systems. For example, as illustrated, the distributed computer system 700 includes three computer systems 702, 704 and 706. As shown, the computer systems 702, 704 and 706 are interconnected by, and may exchange data through, a communication network 708. The network 708 may include any communication network through which computer systems may exchange data. To exchange data via the network 708, the computer systems 702, 704, and 706 and the network 708 may use various methods, protocols and standards including, among others, token ring, Ethernet, Wireless Ethernet, Bluetooth, radio signaling, infra-red signaling, TCP/IP, UDP, HTTP, FTP, SNMP, SMS, MMS, SS7, JSON, XML, REST, SOAP, COREA IIOP, RMI, DCOM and Web Services.

According to some embodiments, the functions and operations discussed for producing a three-dimensional synthetic viewpoint can be executed on computer systems 702, 704 and 706 individually and/or in combination. For example, the computer systems 702, 704, and 706 support, for example, participation in a collaborative network. In one alternative, a single computer system (e.g., 702) can generate the three-dimensional synthetic viewpoint. The computer systems 702, 704 and 706 may include personal computing devices such as cellular telephones, smart phones, tablets, "fablets," etc., and may also include desktop computers, laptop computers, etc.

Various aspects and functions in accord with embodiments discussed herein may be implemented as specialized hardware or software executing in one or more computer systems including the computer systems shown in FIGS. 1-3. In one embodiment, computer system 702 is a personal computing device specially configured to execute the processes and/or operations discussed above. As depicted, the computer system 702 includes at least one processor 710 (e.g., a single core or a multi-core processor), a memory 712, a bus 714, input/output interfaces (e.g., 716) and storage 718. The processor 710, which may include one or more microprocessors or other types of controllers, can perform a series of instructions that manipulate data. As shown, the processor 710 is connected to other system components, including a memory 712, by an interconnection element (e.g., the bus 714).

The memory 712 and/or storage 718 may be used for storing programs and data during operation of the computer system 702. For example, the memory 712 may be a relatively high performance, volatile, random access memory such as a dynamic random access memory (DRAM) or static memory (SRAM). In addition, the memory 712 may include any device for storing data, such as a disk drive or other non-volatile storage device, such as flash memory, solid state, or phase-change memory (PCM). In further embodiments, the functions and operations discussed with respect to generating and/or rendering synthetic three-dimensional views can be embodied in an application that is executed on the computer system 702 from the memory 712 and/or the storage 718. For example, the application can be made available through an "app store" for download and/or purchase. Once installed or made available for execution, computer system 702 can be specially configured to execute the functions associated with producing synthetic three-dimensional views.

Computer system 702 also includes one or more interfaces 716 such as input devices (e.g., camera for capturing images), output devices and combination input/output devices. The interfaces 716 may receive input, provide output, or both. The storage 718 may include a computer-readable and computer-writeable nonvolatile storage medium in which instructions are stored that define a program to be executed by the processor. The storage system 718 also may include information that is recorded, on or in, the medium, and this information may be processed by the application. A medium that can be used with various embodiments may include, for example, optical disk, magnetic disk or flash memory, SSD, among others. Further, aspects and embodiments are not to a particular memory system or storage system.

In some embodiments, the computer system 702 may include an operating system that manages at least a portion of the hardware components (e.g., input/output devices, touch screens, cameras, etc.) included in computer system 702. One or more processors or controllers, such as processor 710, may execute an operating system which may be, among others, a Windows-based operating system (e.g., Windows NT, ME, XP, Vista, 7, 8, or RT) available from the Microsoft Corporation, an operating system available from Apple Computer (e.g., MAC OS, including System X), one of many Linux-based operating system distributions (for example, the Enterprise Linux operating system available from Red Hat Inc.), a Solaris operating system available from Oracle Corporation, or a UNIX operating systems available from various sources. Many other operating systems may be used, including operating systems designed for personal computing devices (e.g., iOS, Android, etc.) and embodiments are not limited to any particular operating system.

The processor and operating system together define a computing platform on which applications (e.g., "apps" available from an "app store") may be executed. Additionally, various functions for generating and manipulating images may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed components, or any combination thereof. Various embodiments may be implemented in part as MATLAB functions, scripts, and/or batch jobs. Thus, the invention is not limited to a specific programming language and any suitable programming language could also be used.

Although the computer system 702 is shown by way of example as one type of computer system upon which various functions for producing three-dimensional synthetic views may be practiced, aspects and embodiments are not limited to being implemented on the computer system shown in FIG. 7. Various aspects and functions may be practiced on one or more computers or similar devices having different architectures or components than that shown in FIG. 7.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-transitory computer-readable medium comprising processor-executable program code, the program code comprising a software component for inclusion in an application, the software component having an application programming interface (API) and configured to:
   obtain from the application executing on a device of a user of the application via the API, personal information about the user of the application;
   identify the type of the obtained personal information;
   determine, based on at least the type of obtained personal information, a required permission from the user for at least one proposed use of the obtained personal information;
   present, to the user, a first offer to provide access to at least one enhanced function of the application in exchange for the required permission; and
   responsive to the user providing the required permission, provide the user with access to the at least one enhanced function of the application.

2. The non-transitory computer-readable medium of claim 1, wherein the at least one enhanced function of the application is functionality not available to at least one other user of the application.

3. The non-transitory computer-readable medium of claim 1, wherein the at least one enhanced function of the application is a reduced number of commercial advertisements presented to the user in the application.

4. The non-transitory computer-readable medium of claim 1, wherein the software component is further configured to present to the user, simultaneously with the first offer, a second offer to provide access to the at least one enhanced function of the application in exchange for a payment from the user; and
   responsive to the user making the payment, provide the user with access to the at least one enhanced function of the application.

5. The non-transitory computer-readable medium of claim 1, wherein the software component is further configured to present, to the user, a second offer to provide access to a second function of the application in exchange for a payment from the user; and
   responsive to the user making the payment, provide the user with access to the second function of the application.

6. The non-transitory computer-readable medium of claim 1, wherein the personal information includes at least one of user location, user name, user address, user background information, user age, user gender, user household income, user family or marital status, or user transactional history.

7. The non-transitory computer-readable medium of claim 1, wherein the at least one proposed use of the personal information includes at least one of analytics, market research, market segmentation, or disclosure to third parties.

8. The non-transitory computer-readable medium of claim 1, wherein the software component is further configured to:
   determine a second required permission from the user for a second at least one proposed use of the personal information;
   present, to the user, a second offer to provide access to a second at least one enhanced function of the application in exchange for the second required permission; and responsive to the user providing the second required permission, provide the user with access to the second at least one enhanced function of the application.

9. The non-transitory computer-readable medium of claim 1, wherein determining the required permission from the user for the at least one proposed use of the personal information is performed with reference to at least one of a current location of the user, a previous location of the user, or a residential location of the user.

10. The non-transitory computer-readable medium of claim 1, wherein the application is a mobile application installed on a mobile device.

11. The non-transitory computer-readable medium of claim 1, wherein the software component is further configured to identify at least one piece of personal information to be collected by the application and the at least one proposed use of the personal information based on a privacy policy of the application.

12. The non-transitory computer-readable medium of claim 1, wherein the software component is further configured to:
   determine a value for the required permission from the user for at least one proposed use of the personal information; and
   generate the first offer based, at least in part, on the value for the required permission.

13. The non-transitory computer-readable medium of claim 12, wherein the value is determined with reference to at least one of the type of the personal information or demographic information for the user.

14. The non-transitory computer-readable medium of claim 1, wherein the software component is further configured to display at least one item of personal information about the user proposed to be collected by the application in a display matrix, the at least one item of personal information being visually related to the at least one proposed use of the personal information.

15. The non-transitory computer-readable medium of claim 14, wherein the display matrix is presented on one of a website and the application.

16. The non-transitory computer-readable medium of claim 1, wherein the software component is further configured to receive an indication regarding required permission via a user interface of the device.

17. The non-transitory computer-readable medium of claim 16, wherein the indication comprises a gesture.

18. A method implemented using a software component having an application programming interface (API), the method comprising:
   obtaining from the application executing on a device of a user of the application via the API, personal information about the user of the application;
   identifying the type of the obtained personal information;
   determining, based on at least the type of obtained personal information, a required permission from the user for at least one proposed use of the obtained personal information;
   presenting, to the user, a first offer to provide access to at least one enhanced function of the application in exchange for the required permission; and
   responsive to the user providing the required permission, providing the user with access to the at least one enhanced function of the application.

19. The method of claim 18, wherein the value is determined with reference to at least one of the type of the personal information or demographic information for the user.

20. The method of claim 18, wherein the at least one enhanced function of the application is functionality not available to at least one other user of the application.

21. The method of claim 18, wherein the personal information includes at least one of user location, user name, user address, user background information, user age, user gender, user household income, user family or marital status, or user transactional history.

22. The method of claim 18, wherein the at least one proposed use of the personal information includes at least one of analytics, market research, market segmentation, or disclosure to third parties.

23. The method of claim 18, wherein determining the required permission from the user for the at least one proposed use of the personal information is performed with reference to at least one of a current location of the user, a previous location of the user, or a residential location of the user.

24. A non-transitory computer-readable medium comprising processor-executable program code, the program code configured to:
   receive from an application executing on a device of a user a type of personal information to be obtained;
   determine, based on at least the type of the personal information to be obtained, at least one required permission from the user for at least one proposed use of the obtained personal information;
   present, to the user, a list comprising the at least one required permission;
   receive a selection of the at least one required permission; and
   determine if the selection of the at least one required permission is associated with a payment requirement and if so receive a payment associated with the payment requirement.

* * * * *